United States Patent
Fei et al.

(10) Patent No.: US 12,555,289 B2
(45) Date of Patent: Feb. 17, 2026

(54) AUTOMATED ANNOTATIONS FOR COMPUTER-AIDED DESIGN (CAD) DRAWINGS

(71) Applicant: Autodesk, Inc., San Francisco, CA (US)

(72) Inventors: Dawei Fei, Singapore (SG); Pradeep Kumar Jayaraman, Ajax (CA); Kin Ming Kevin Cheung, Singapore (SG)

(73) Assignee: AUTODESK, INC., San Francisco, CA (US)

( * ) Notice: Subject to any disclaimer, the term of this patent is extended or adjusted under 35 U.S.C. 154(b) by 147 days.

(21) Appl. No.: 18/617,134

(22) Filed: Mar. 26, 2024

(65) Prior Publication Data

US 2025/0308110 A1  Oct. 2, 2025

(51) Int. Cl.
*G06T 11/60* (2006.01)
*G06F 30/12* (2020.01)
*G06T 7/60* (2017.01)

(52) U.S. Cl.
CPC .............. *G06T 11/60* (2013.01); *G06F 30/12* (2020.01); *G06T 7/60* (2013.01); *G06T 2200/24* (2013.01); *G06T 2207/20081* (2013.01)

(58) Field of Classification Search
CPC ............... G06T 2200/24; G06T 11/60; G06T 2207/20081; G06T 7/60; G06F 30/12
See application file for complete search history.

(56) References Cited

U.S. PATENT DOCUMENTS

| | | | |
|---|---|---|---|
| 9,640,043 B1* | 5/2017 | Dockrey | G01B 21/047 |
| 2008/0180460 A1* | 7/2008 | Ford | G06F 30/00 |
| | | | 345/660 |
| 2008/0297513 A1* | 12/2008 | Greenhill | G06Q 99/00 |
| | | | 345/589 |
| 2020/0387788 A1* | 12/2020 | Alves | G06N 3/0464 |
| 2024/0331282 A1* | 10/2024 | Atherton | G06V 10/44 |
| 2024/0338860 A1* | 10/2024 | Trzyna | G06F 40/44 |

OTHER PUBLICATIONS

Jayaraman, P.K., et al., "SolidGen: An Autoregressive Model for Direct B-rep Synthesis", Machine Learning Research, 2022, pp. 1-26.

(Continued)

*Primary Examiner* — Phi Hoang
(74) *Attorney, Agent, or Firm* — Gates & Cooper LLP

(57) ABSTRACT

A method and system provide for annotating a computer-aided design (CAD) drawing. Existing drawings are obtained and include annotations and geometries that serve as annotation points. The geometries are extracted and an Autoregressive Transformer model is trained on the extracted geometries and annotations. A new drawing is obtained. First user input selecting a first geometry in the new drawing is received and the first annotation is created. The new geometries are extracted. The Autoregressive Transformer model generates potential new annotation points and annotations. The potential new annotation points are connected to the selected first geometry and fall within a defined spatial boundary. The potential new annotations are displayed in the new drawing and second user input selects one of the potential new annotations to utilize as one or more new annotations.

20 Claims, 8 Drawing Sheets

(56) References Cited

OTHER PUBLICATIONS

"Product Documentation—Dimensions (Drawings workspace)", Fushion Help, Autodesk, https://help.autodesk.com/view/fusion360/ENU/?guid=DWG-DIMENSIONS, pp. 1-7, as downloaded Feb. 21, 2024.

"Product Documentation—Create auto dimensions", Fusion Help, Autodesk, https://help.autodesk.com/view/fusion360/ENU/?guid=DWG-AUTO-DIMENSION, pp. 1-4, as downloaded Feb. 21, 2024.

"Mleader (Command)", Autodesk, AutoCAD web application Help, https://help.autodesk.com/view/ACADWEB/ENU/?guid=AutoCAD_Web_Help_List_Commands_MLEADER_html, p. 1, as downloaded Feb. 21, 2024.

"Dimension (Command)", Autodesk, AutoCAD web application Help, https://help.autodesk.com/view/ACADWEB/ENU/?guid=AutoCAD_Web_Help_List_Commands_DIMENSION_html, pp. 1-2, as downloaded Feb. 21, 2024.

"QDIM (Command)", Autodesk, AutoCAD 2023 Help, https://help.autodesk.com/view/ACD/2023/ENU/?guid=GUID-1FB628B7-C2AF-4B6D-B83E-20ADDD70614D, pp. 1-2, as downloaded Feb. 21, 2024.

\* cited by examiner

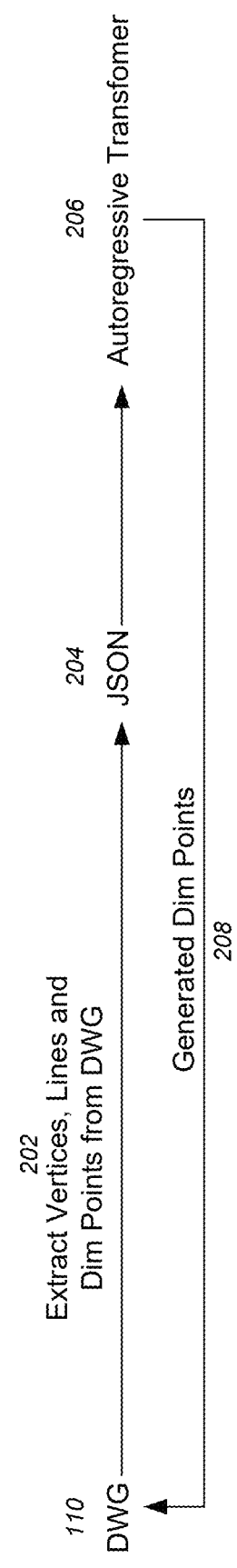

AUTOMATED ANNOTATIONS FOR COMPUTER-AIDED DESIGN (CAD) DRAWINGS

BACKGROUND OF THE INVENTION

1. Field of the Invention

The present invention relates generally to computer aided design (CAD) drawings, and in particular, to a method, apparatus, system, and article of manufacture for utilizing machine learning to automatically generate and insert annotations, such as dimensions and leaders, into CAD drawings.

2. Description of the Related Art

Annotations such as dimensions and leaders for Computer Aided Design (CAD) drawings (DWG) are necessary for providing the manufacturer with sufficient information to bring the design to reality. The process is tedious and error prone as the number of annotations in a drawing can be huge. Unfortunately, existing solutions are restricted to only dimensions and they either make the user manually apply dimensions one at a time or suffer from the "dimension-explosion" problem (also referred to as "over-dimensioning") whereby similar patterns in a drawing are dimensioned unnecessarily. To better understand the problems of the prior art, a description of prior art dimensioning may be useful.

Some prior art products (e.g., AUTOCAD available from the assignee of the present application) may provide "Dim"/ "Dimension" and/or "MLeader" commands. The "Dim" command creates multiple types of dimensions within a single command session. When a user hovers over an object for dimensioning, the "Dim" command automatically previews a suitable dimension type to use. The user may select object, lines, or points, to dimension, and click anywhere in the drawing area to draw the dimension. Dimension types may include vertical linear, horizontal linear, aligned linear, angular, radius, and/or diameter. The "MLeader" command is the command used to created a multi-leader object consisting of an arrowhead, a leader line, and a multiline text object. To create an multi-leader object, the user clicks an icon for the multileader (or types in the MLeader command), clicks the drawing area to specify the leader's arrowhead location, clicks to specify the leader's landing location, enters desired text in a text box, and then clicks a check mark to finish the creation process. However, the Dim and MLeader command work on one geometry at a time.

Another command available in the prior art is the QDim command that creates a series of dimensions from selected objects. While the QDim command provides annotations for every edge (of a selected object), it still requires the user to manually select multiple objects within a single command session.

Additional prior art applications (e.g., GHOSTWRITER) may provide a graph network model that requires the user's historical drawings to identify similar parts to mimic the user's dimensioning strategy. GHOSTWRITER does not prescribe any methods for user interactions.

Prior art Auto Dimensioning Engines (ADE) may also provide various dimensioning algorithms such as the Aligned Dimension Generator Algorithm but the algorithm generates/suggests dimensions for similar patterns at the same time. A slider allows the user to adjust the number of dimensions generated. Consequently, dimensions are generated for similar patterns in a drawing.

In view of the above, what is needed is a system capable of intelligently and automatically generating annotations for a drawing while avoiding over-dimensioning.

SUMMARY OF THE INVENTION

Embodiments of the invention utilize Autoregressive Transformers and a progressive preview display to provide intelligent suggestions that will get more accurate with each user input. Most solutions today either employ algorithms that display too many dimensions or display all the dimensions at the same time which makes it difficult for the user to adjust any wrong suggestions or improve the suggestions' accuracy with more user inputs.

In addition, embodiments of the invention provide a range of annotations such as dimensions, leaders, etc. and are not limited to just dimensions.

BRIEF DESCRIPTION OF THE DRAWINGS

Referring now to the drawings in which like reference numbers represent corresponding parts throughout:

FIG. 2A illustrates a training pipeline and FIG. 2B illustrates an inference pipeline in accordance with one or more embodiments of the invention;

DETAILED DESCRIPTION OF THE INVENTION

Figure 1:
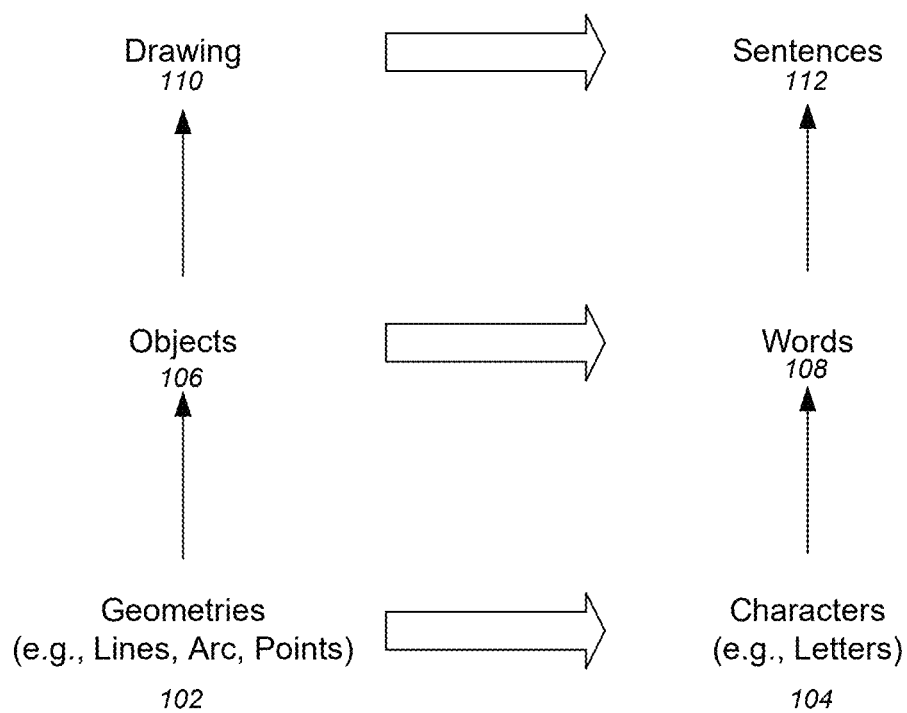
FIG. 1 illustrates the technical intuition for viewing drawings in accordance with one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention utilize artificial intelligence to free up customers to create great designs and not get trapped in repetitive and boilerplate chores. In this regard, embodiments of the invention suggest annotations such as dimensions and leaders to reduce routine annotative tasks. More specifically, embodiments of the invention provide suggested annotations based on connected components and a spatial region.

In view of the above, there are two phases utilized in embodiments of the invention: (a) a training phase; and (b) an inference phase. Both phases are considered separate activities and may be conducted at different points in time.

For the training phase, an Autoregressive Transformer model is trained with a large number of drawings (e.g., thousands to millions of drawings) where "weights" of the model are determined. In this regard, the training dataset may be required to be large enough so that the model's weights are sufficiently generalized for users in the field (e.g., a minimum threshold number of drawings may be required). Thereafter, in one or more embodiments, the weights do not change unless the model is trained again.

During the inference phase, the model is passed a current/new drawing that is to be inferred for annotations (e.g., dimensions). In one or more embodiments, the model does not actually store geometries and annotations but uses them to generate a new set of annotation points. Instead, the model may only "store" the weights that are trained/learned in the training phase.

In one or more embodiments, the weights of the transformer actually stay constant throughout an annotation session. The accuracy of the suggestions improve because not all of the annotation suggestions for a drawing may be shown/presented to the user. Instead, the suggestions shown/presented may be limited to those that fall within a spatial boundary and whose geometries are connected to the "parent" geometry. In this way, when the user selects the next geometry to annotate, the list of new annotations generated will be more accurate because the previous set of selected annotations will be part of the new input to the transformer. Internally, the Autoregressive Transformer model may also provide more accurate suggestions because the next suggestion (in the list of suggestions to be generated for a selected geometry) may be generated based on the previously suggested annotations (e.g., sequentially). This is in contrast to prior art non-Autoregressive Transformers which predict all annotations for a drawing at once.

Further to the above, the model weights may be updated during retraining for all users so that it is not skewed toward a single user. In one or more embodiments, the retraining may be performed when metrics in the field have dropped significantly or when a threshold amount of new data has been acquired (e.g., on backend servers that collect drawings/annotations). In alternative embodiment, different models (and/or different weights) may be utilized for different users/sets of users to personalize suggestions for a user/set of users.

Annotation Generation

Embodiments of the invention utilize Autoregressive Transformers to intelligently generate the appropriate annotations for a drawing. Examples of Autoregressive Transformers include the GPT (Generative Pre-Trained Transformer) family of Transformers like GPT-2 and GPT-3. In AUTODESK, the SOLIDGEN model (see Jayaraman et. al., "SolidGen: An Autoregressive Model for Direct B-rep Synthesis," Published in Transactions on Machine Learning Research, Feb. 21, 2023) is also an example of an Autoregressive Transformer that may be utilized for embodiments of the invention. Nevertheless, embodiments of the invention may apply to/utilize any Autoregressive Transformer available. As used herein, an Autoregressive Transformer is a model that leverages prior tokens to predict a next token iteratively and probabilistic inference is employed to generate text/geometry (and/or the item/object/subject that the model is attempting to predict). In other words, suggestions generated by the Autoregressive model are based on a user's previous input and as more input is received, suggestions become more accurate. Autoregressive transformers may also be viewed as a type of neural network architecture designed for sequence modeling tasks, where the model generates each output in a sequence one at a time, using the previously generated outputs as part of the input for generating the next one. This approach allows the model to capture the dependencies between elements in the sequence, making it particularly effective for tasks like natural language processing or time-series analysis.

FIG. 1 illustrates the technical intuition for viewing drawings in accordance with one or more embodiments of the invention. In particular, intuitively, a drawing can be interpreted as a language with the geometries 102 mapping to characters 104 and objects 106 or groups of geometries such as blocks or dimensions mapping to words 108. The drawing 110 itself can then be viewed as a sentence 112 or essay.

Figure 3:
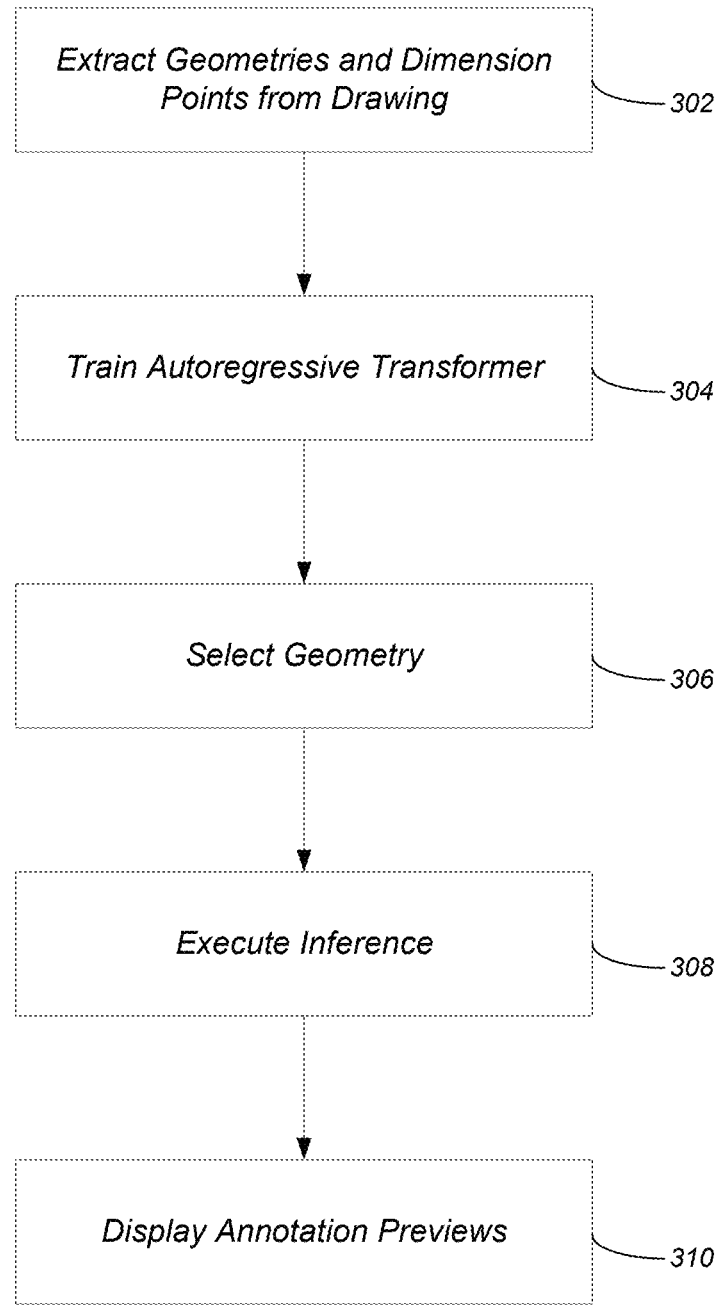
FIG. 3 provides a high-level flow of the solution of embodiments of the invention in view of FIGS. 2A and 2B.

FIG. 2A illustrates a training pipeline and FIG. 2B illustrates an inference pipeline in accordance with one or more embodiments of the invention. FIG. 3 provides a high-level flow of the solution of embodiments of the invention in view of FIGS. 2A and 2B.

Referring to FIG. 2A and FIG. 3, at step 302, geometries such as vertices and lines and dimension points are extracted 202 from a drawing 110.

In the training pipeline of FIG. 2A, the extracted geometries and dimension points are used to generate JSON (Java Scrip Object Notation) objects 204. The JSON objects 204 are then used to train the Autoregressive Transformer 206 at step 304.

Referring to FIG. 3, when a user selects geometry at step 306 (e.g., by clicking on a line, arc or a point), the inference pipeline of FIG. 2B is executed at step 308.

Referring to FIG. 2B, based on the geometry selection (i.e., the selection of a line, arc or point, the Autoregressive Transformer 206 generates dimension points 208 that are provided to the drawing 110 for display. In this regard, at step 310, a preview of the annotations that are associated with the selected geometries is displayed in the drawing 110. This creates a feedback loop for further selection of the geometries that are fed back to the Autoregressive Transformer 206 to enable further/more accurate dimension suggestions/dimensioning. In this regard, the Autoregressive Transformer 206 predicts annotations based on previous inputs.

In one or more embodiments of the invention, the annotation previews that are displayed must satisfy one or more conditions. For example, only annotation previews that meet the following conditions may be displayed:
   a. The geometry of the annotation preview is connected to the parent geometry (i.e., the geometry of the annotation preview is connected to the geometry/object selected in step 306). In this regard, a connected component is an object/component that is connected/linked to another object/component. In this regard, in the context of CAD drawings, the term "connected" typically refers to geometries or components that share a common point, line, or plane, or are otherwise linked through a relationship or constraint. In one or more embodiments, connected geometries or components share a common boundary (point, line, or plane), or are associated through a defined relationship or constraint within the CAD system.
   b. As used herein, once a user selects a parent geometry, annotation previews are limited to additional objects/geometries connected to the selected parent geometry.

c. The number of annotations fall within a specified limit (i.e., a max number of dimensions are displayed); and d. The annotations fall within a spatial boundary (i.e., of the selected geometry) (i.e., a defined proximity based annotation).

In view of the above, embodiments of the invention are intended to include any manner/mechanism for defining the spatial boundary. For example, the spatial boundary may be a defined boundary/region—e.g.: within a defined distance/range/proximity of the selected parent geometry. In other embodiments, the spatial boundary may be a percentage of the area currently displayed on the screen. In yet another embodiment, the spatial boundary may be a user defined boundary/area/region such as a square, circle, that may be identified using a cursor control device. In alternative embodiments, the spatial boundary may be a region defined via user type/permissions, for example, an electrical contractor may have a spatial boundary/layer defined that limits annotations to electrical components and excludes plumbing components. In another exemplary embodiment, an architect for project A may have a spatial boundary that excludes Project/Area B. In view of the above and as used herein, a spatial boundary in CAD drawings may be a defined area where certain operations are applied-a spatial boundary may be: (1) Proximity-Based (defined by a distance from a selected point); (2) Viewport-Based (an area from which the user views the drawing); (3) User-Defined (manually drawn or selected by the user); and/or (4) Project-Based (specific to certain projects or areas within a drawing) etc. The method for defining a spatial boundary can vary based on the CAD software and user needs.

The satisfaction of the above-described conditions is to prevent overloading the user with too many annotations as a drawing can contain a large number of geometries. At the same time, the user's incremental inputs can also help the Autoregressive Transformer 208 to come up with more accurate predictions.

One intention of embodiments of the invention is to use the Transformer model to generate not just the geometry that is the host of the annotation, but also attributes such as the:

a. Type of annotation, e.g. rotated or radial dimension, mleader, etc.

b. Offset (e.g., a distance from each of the one or more potential new annotations from a corresponding annotation point to the dimension line; and c. Style of the annotation, e.g. color or layout of the dimensions.

Figure 4:
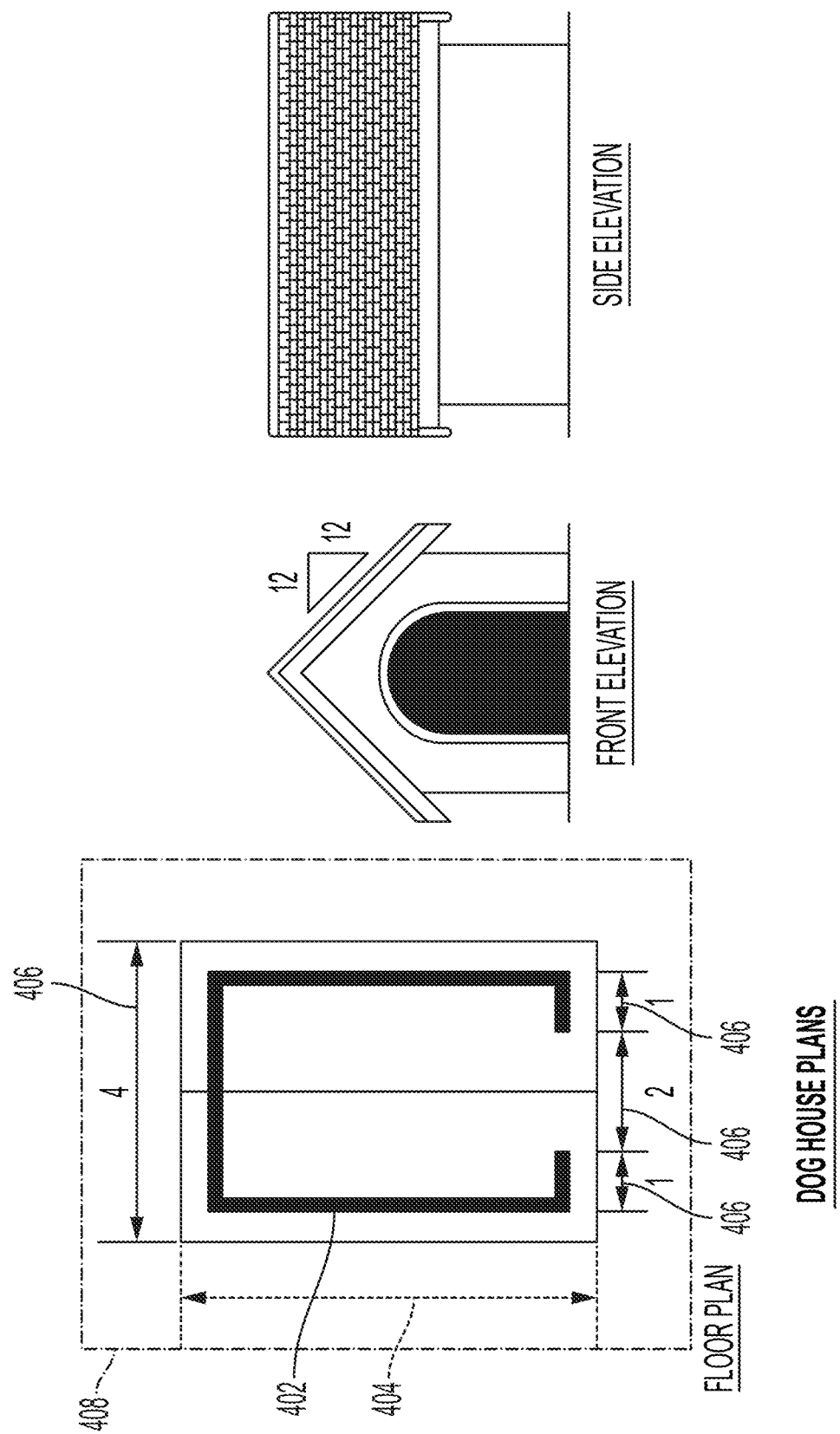
FIG. 4 illustrates automatic annotations providing dimensioning in accordance with one or more embodiments of the invention.

FIG. 4 illustrates automatic annotations providing dimensioning in accordance with one or more embodiments of the invention. In the first step, the user selects a first geometry 402 (e.g., an edge of the dog house floor plan) to be dimensioned and the dimension 404 is displayed. In other words, the first dimension 404 may be manually created from the points selected by the user. After the user manually creates the first dimension 404, the dimension suggestions/previews may kick in. Thus, after the first dimension 404 is created, embodiments of the invention (e.g., via an Autoregressive Transformer and model) automatically generate (potential/preview) dimensions 406 that are previewed on the display. As described above, the annotation/dimension predictions/previews may be limited to connected geometries and/or a spatial boundary 408 (i.e., they are proximity-based predictions).

Once the dimension 404 is selected by the user, the preview dimensions 406 are displayed and the user can accept the predictions 406 iteratively using the "tab" key or a mouse. Alternatively, the user can accept all predictions 406 using the "Enter" key. Alternative methods for accepting predictions 406 (either all at once or by iteratively stepping through the predictions 406) may be utilized (e.g., via keyboard controls, stylus device, cursor control devices, gesture based controls, eye wink based interactions, eye/visual gaze, etc.). In one or more exemplary embodiments, the user can either: (a) accept the next suggestion by clicking the Tab key; or (b) Alt+Tab to skip to the next suggestion; or (c) use the mouse to select the annotations desired; or (d) click enter to accept all suggestions.

In view of the above, after a user selects the first points, the first dimension may be manually created from the points selected by the user. After the user manually creates the first dimension, the dimension suggestions kick in. After cycling through all of the suggestions, the user can then choose another geometry to dimension and after manually creating that dimension, the suggestions kick in again.

Figure 5:
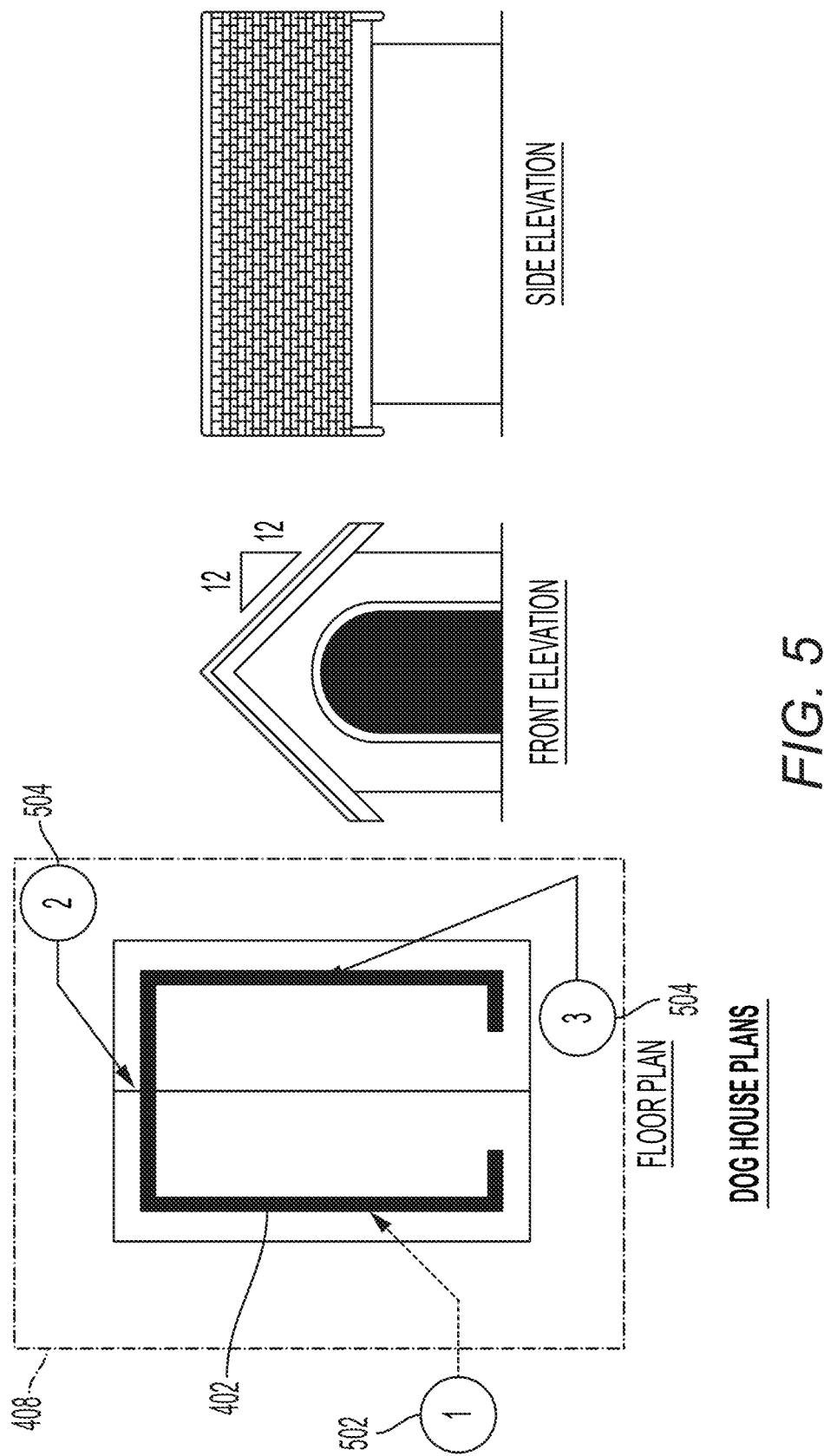
FIG. 5 illustrates automatic annotations providing leaders in accordance with one or more embodiments of the invention.

FIG. 5 illustrates automatic annotations providing leaders in accordance with one or more embodiments of the invention. Similar to FIG. 4, in the first step, the user selects a first geometry 402 (e.g., an edge of the dog house floor plan) for a leader and the 502 is displayed. Thereafter, embodiments of the invention (e.g., via an Autoregressive Transformer) automatically generate leaders/mleader 504 that are previewed on the display. As described above, the annotation/leader predictions/previews may be limited to connected geometries and/or a spatial boundary 408 (i.e., they are proximity-based predictions).

Once the model generated preview leaders 504 are displayed, the user can accept the predictions 504 iteratively using the "tab" key or a mouse. Alternatively, the user can accept all predictions 504 using the "Enter" key. Similar to the dimensions illustrated in FIG. 4, alternative methods for accepting predictions 504 (either all at once or by iteratively stepping through the predictions 504) may be utilized (e.g., via keyboard controls, stylus device, cursor control devices, gesture based controls, eye wink based interactions, eye/visual gaze, etc.). In one or more exemplary embodiments, the user can either: (a) accept the next suggestion by clicking the Tab key; or (b) Alt+Tab to skip to the next suggestion; or (c) use the mouse to select the annotations desired; or (d) click enter to accept all suggestions.

As the model employed is autoregressive, the suggestions generated (e.g., dimensions 404 or leaders 504) will be more accurate as the user provides more inputs.

Summary of Logical Flow

Figure 6:
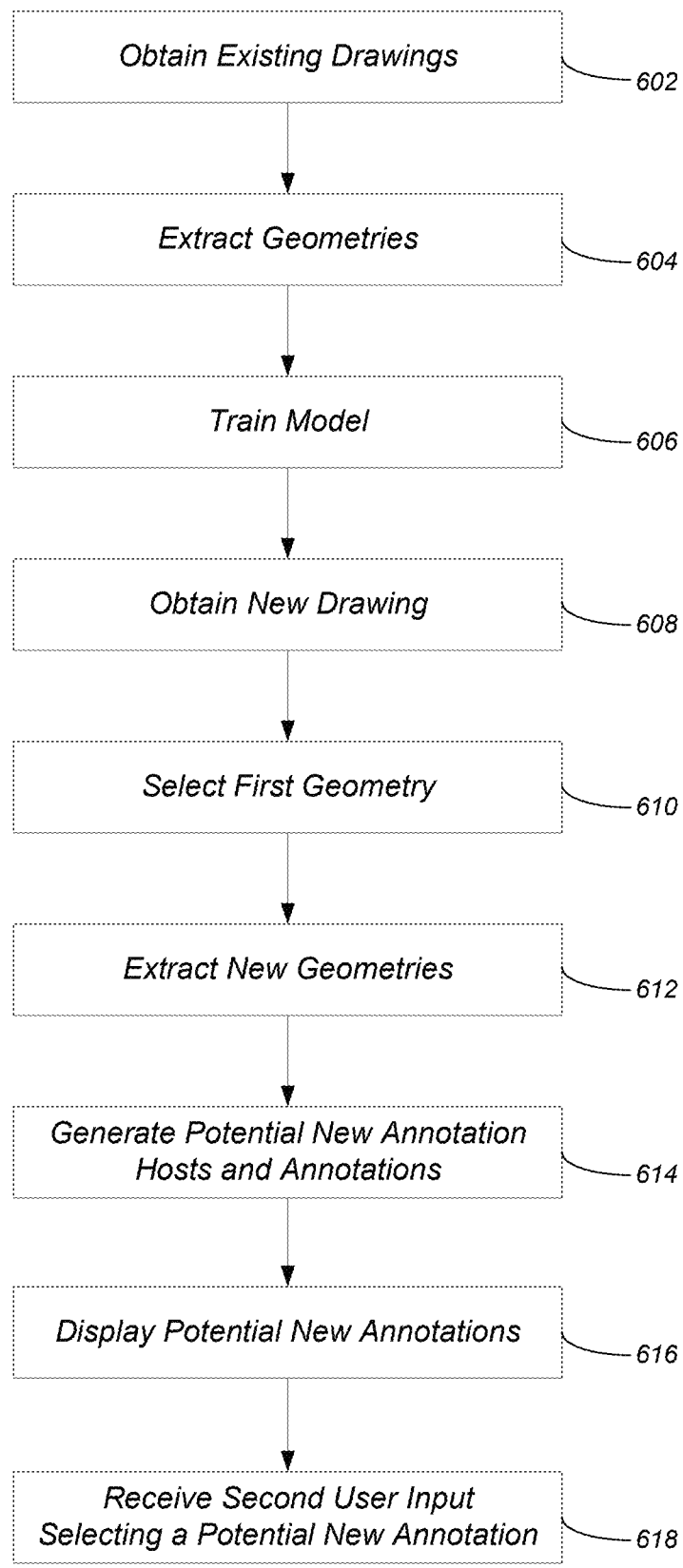
FIG. 6 illustrates a summary of the logical flow for annotating a computer-aided design (CAD) drawing in accordance with one or more embodiments of the invention.

In view of the above, FIG. 6 illustrates a summary of the logical flow for annotating a computer-aided design (CAD) drawing in accordance with one or more embodiments of the invention.

At step 602, one or more existing drawings are obtained. Each of the one or more existing drawings includes: (1) one or more geometries that serve as annotation points (also referred to as hosts [e.g., points, lines, arcs, etc.]); and (2) annotations associated with the annotation points. In one or more embodiments, each of the one or more geometries is a vertex or a line.

At step 604, the one or more geometries are extracted from the existing drawings.

At step 606, the Autoregressive Transformer model is trained based on the extracted one or more geometries and the (existing) annotations of the one or more existing drawings.

At step 608, a new drawing is obtained and consists of one or more new geometries.

At step 610, first user input is received for (a) selecting a first geometry of the one or more new geometries; and (b) creating a first annotation.

At step 612, one or more new geometries are extracted from the new drawing.

At step 614, the Autoregressive Transformer model generates one or more potential new annotation points and one or more potential new annotations (associated with the one or more potential new annotation points). The potential new annotation points and potential new annotations are based on: (a) the extracted new geometries (e.g., all of the existing geometries in the drawing); (b) the first geometry selected by the user; and (c) the first annotation created by the user (and/or all existing annotations in the drawing). Requirements (for generating the new points and annotations) may include that the one or more potential new annotation points are connected to the first geometry selected via the first user input, and that the one or more potential new annotation points fall within a defined spatial boundary. Accordingly, in one or more embodiments, once new annotation points and attributions are generated, annotation points not in the spatial boundary may be filtered out.

One additional requirement may provide that a number of the one or more potential new annotation points fall within a specified limit (i.e., a maximum number potential new annotations are generated).

In one or more embodiments, the Autoregressive Transformer model may also generate an attribute for the one or more potential new annotations (and/or annotation points). One exemplary attribute provides a type of annotation (e.g., a dimension or a leader/mleader). Another exemplary attribute is an offset for each of the one or more potential new annotations (e.g., a distance for each of the one or more potential new annotations from a corresponding annotation point to a dimension line). In an additional exemplary embodiment, the attribute may be a style for each of the one or more potential new annotations. In view of the above, the Autoregressive Transformer generates new annotation points and annotation attributes based on all of the existing geometries or annotations in the drawing. The annotation points not in the spatial boundary may then be filtered out.

At step 616 the one or more potential new annotations are displayed in the new drawing.

At step 618, second user input is received selecting one or more of the one or more potential new annotations to utilize as one or more new annotations. Such second user input may include cycling through each of the one or more potential new annotations via use of a keyboard control mechanism and/or selecting the one or more of the one or more potential new annotations via a cursor control device (e.g., a mouse and/or a stylus).

Hardware Environment

Figure 7:
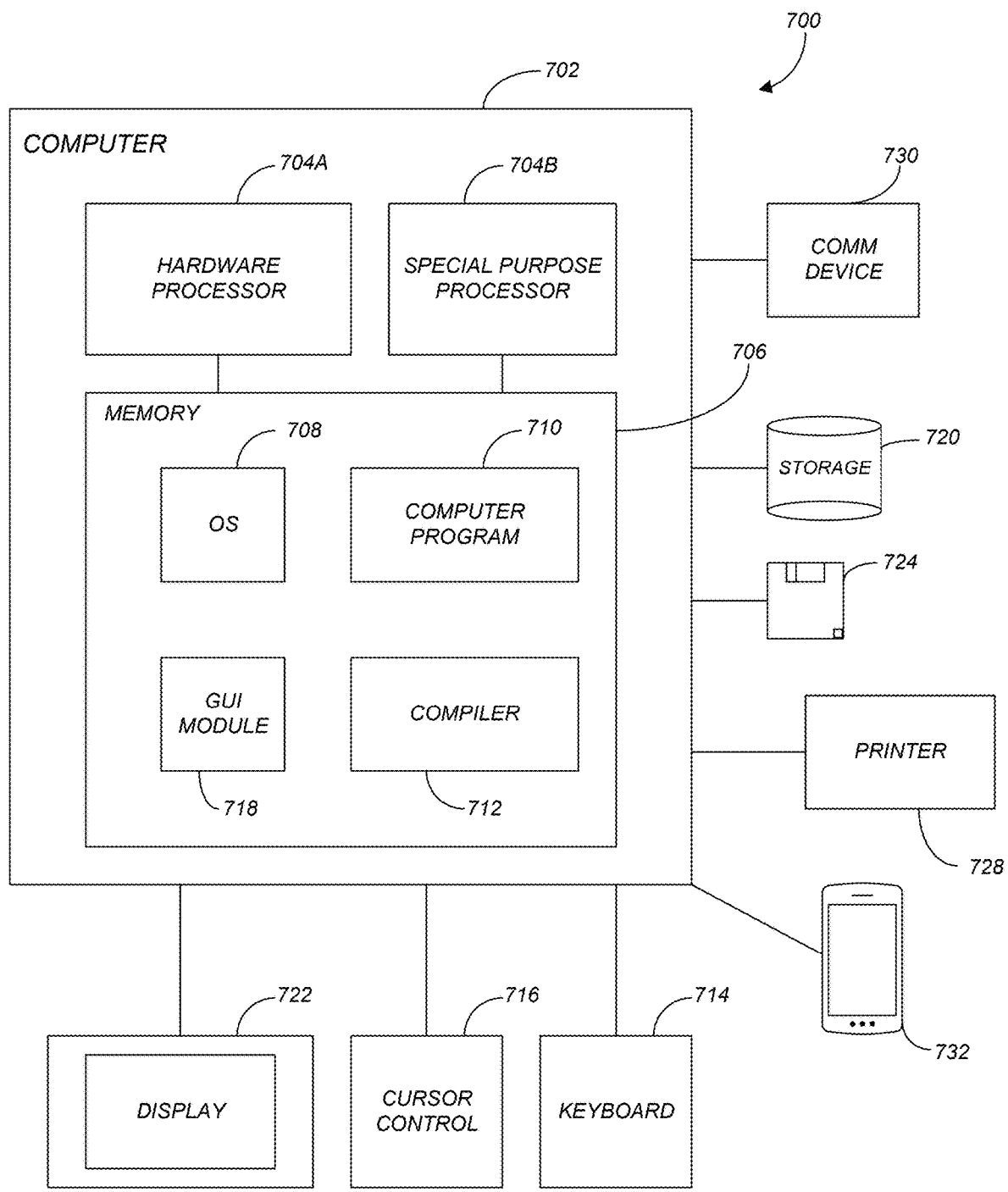
FIG. 7 is an exemplary hardware and software environment used to implement one or more embodiments of the invention.

FIG. 7 is an exemplary hardware and software environment 700 (referred to as a computer-implemented system and/or computer-implemented method) used to implement one or more embodiments of the invention. The hardware and software environment includes a computer 702 and may include peripherals. Computer 702 may be a user/client computer, server computer, or may be a database computer. The computer 702 comprises a hardware processor 704A and/or a special purpose hardware processor 704B (hereinafter alternatively collectively referred to as processor 704) and a memory 706, such as random access memory (RAM). The computer 702 may be coupled to, and/or integrated with, other devices, including input/output (I/O) devices such as a keyboard 714, a cursor control device 716 (e.g., a mouse, a pointing device, pen and tablet, touch screen, multi-touch device, etc.) and a printer 728. In one or more embodiments, computer 702 may be coupled to, or may comprise, a portable or media viewing/listening device 732 (e.g., an MP3 player, IPOD, NOOK, portable digital video player, cellular device, personal digital assistant, etc.). In yet another embodiment, the computer 702 may comprise a multi-touch device, mobile phone, gaming system, internet enabled television, television set top box, or other internet enabled device executing on various platforms and operating systems.

In one embodiment, the computer 702 operates by the hardware processor 704A performing instructions defined by the computer program 710 (e.g., a computer-aided design [CAD] application) under control of an operating system 708. The computer program 710 and/or the operating system 708 may be stored in the memory 706 and may interface with the user and/or other devices to accept input and commands and, based on such input and commands and the instructions defined by the computer program 710 and operating system 708, to provide output and results.

Output/results may be presented on the display 722 or provided to another device for presentation or further processing or action. In one embodiment, the display 722 comprises a liquid crystal display (LCD) having a plurality of separately addressable liquid crystals. Alternatively, the display 722 may comprise a light emitting diode (LED) display having clusters of red, green and blue diodes driven together to form full-color pixels. Each liquid crystal or pixel of the display 722 changes to an opaque or translucent state to form a part of the image on the display in response to the data or information generated by the processor 704 from the application of the instructions of the computer program 710 and/or operating system 708 to the input and commands. The image may be provided through a graphical user interface (GUI) module 718. Although the GUI module 718 is depicted as a separate module, the instructions performing the GUI functions can be resident or distributed in the operating system 708, the computer program 710, or implemented with special purpose memory and processors.

In one or more embodiments, the display 722 is integrated with/into the computer 702 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 702 according to the computer program 710 instructions may be implemented in a special purpose processor 704B. In this embodiment, some or all of the computer program 710 instructions may be implemented via firmware instructions stored in a read only memory (ROM), a programmable read only memory (PROM) or flash memory within the special purpose processor 704B or in memory 706. The special purpose processor 704B may also be hardwired through circuit design to perform some or all of the operations to implement the present invention. Further, the special purpose processor 704B may be a hybrid processor, which includes dedicated circuitry for performing a subset of functions, and other circuits for performing more general functions such as responding to computer program 710 instructions. In one embodiment, the special purpose processor 704B is an application specific integrated circuit (ASIC).

The computer 702 may also implement a compiler 712 that allows an application or computer program 710 written in a programming language such as C, C++, Assembly, SQL, PYTHON, PROLOG, MATLAB, RUBY, RAILS, HASKELL, or other language to be translated into processor 704 readable code. Alternatively, the compiler 712 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 710 accesses and manipulates data accepted from I/O devices and stored in the memory 706 of the computer 702 using the relationships and logic that were generated using the compiler 712.

The computer 702 also optionally comprises an external communication device such as a modem, satellite link, Ethernet card, or other device for accepting input from, and providing output to, other computers 702.

In one embodiment, instructions implementing the operating system 708, the computer program 710, and the compiler 712 are tangibly embodied in a non-transitory computer-readable medium, e.g., data storage device 720, which could include one or more fixed or removable data storage devices, such as a zip drive, floppy disc drive 724, hard drive, CD-ROM drive, tape drive, etc. Further, the operating system 708 and the computer program 710 are comprised of computer program 710 instructions which, when accessed, read and executed by the computer 702, cause the computer 702 to perform the steps necessary to implement and/or use the present invention or to load the program of instructions into a memory 706, thus creating a special purpose data structure causing the computer 702 to operate as a specially programmed computer executing the method steps described herein. Computer program 710 and/or operating instructions may also be tangibly embodied in memory 706 and/or data communications devices 730, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 702.

Figure 8:
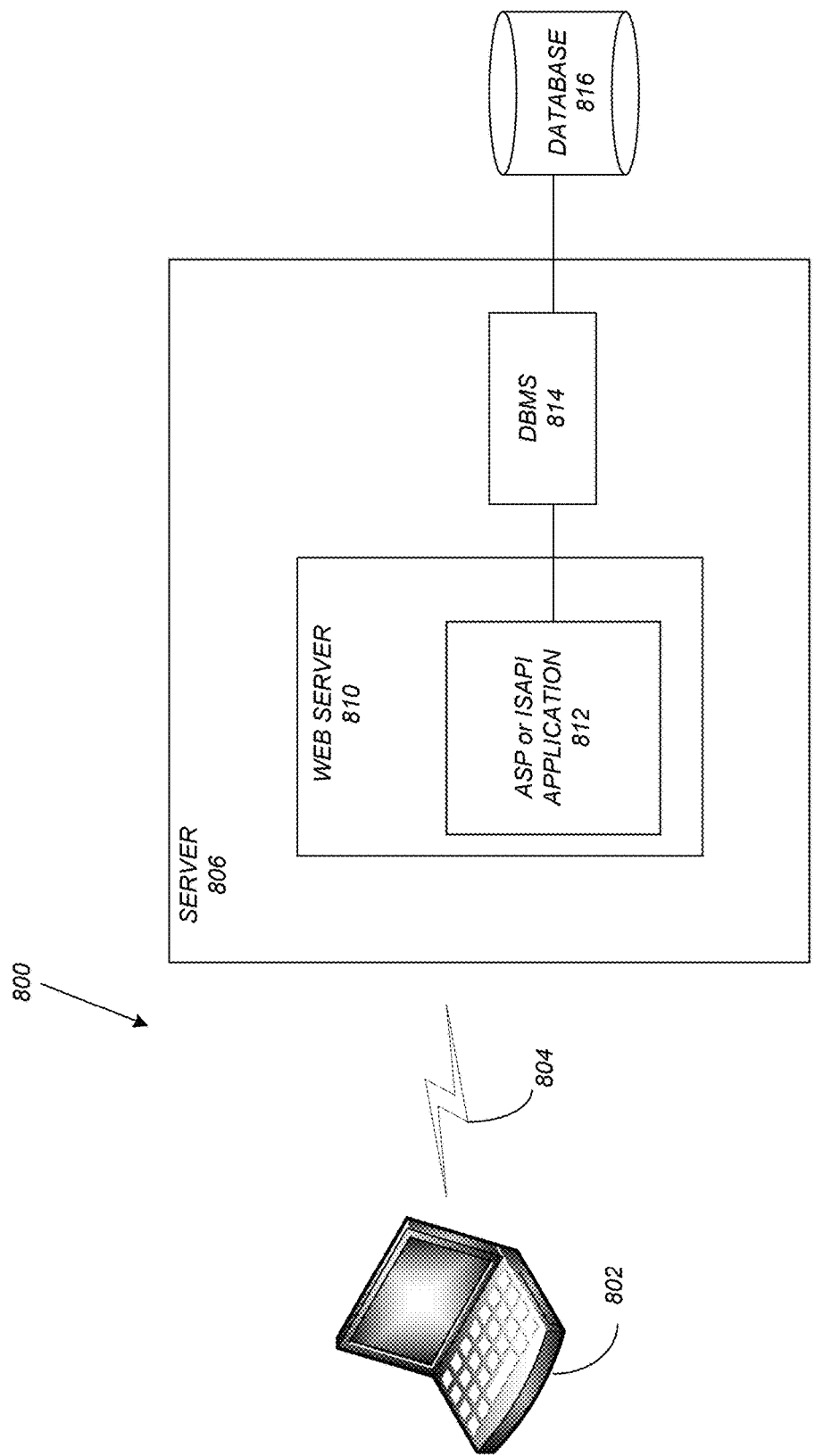
FIG. 8 schematically illustrates a typical distributed/ cloud-based computer system in accordance with one or more embodiments of the invention.

FIG. 8 schematically illustrates a typical distributed/cloud-based computer system 800 using a network 804 to connect client computers 802 to server computers 806. A typical combination of resources may include a network 804 comprising the Internet, LANs (local area networks), WANs (wide area networks), SNA (systems network architecture) networks, or the like, clients 802 that are personal computers or workstations (as set forth in FIG. 7), and servers 806 that are personal computers, workstations, minicomputers, or mainframes (as set forth in FIG. 7). However, it may be noted that different networks such as a cellular network (e.g., GSM [global system for mobile communications] or otherwise), a satellite based network, or any other type of network may be used to connect clients 802 and servers 806 in accordance with embodiments of the invention.

A network 804 such as the Internet connects clients 802 to server computers 806. Network 804 may utilize ethernet, coaxial cable, wireless communications, radio frequency (RF), etc. to connect and provide the communication between clients 802 and servers 806. Further, in a cloud-based computing system, resources (e.g., storage, processors, applications, memory, infrastructure, etc.) in clients 802 and server computers 806 may be shared by clients 802, server computers 806, and users across one or more networks. Resources may be shared by multiple users and can be dynamically reallocated per demand. In this regard, cloud computing may be referred to as a model for enabling access to a shared pool of configurable computing resources.

Clients 802 may execute a client application or web browser and communicate with server computers 806 executing web servers 810. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 802 may be downloaded from server computer 806 to client computers 802 and installed as a plug-in or ACTIVEX control of a web browser. Accordingly, clients 802 may utilize ACTIVEX components/component object model (COM) or distributed COM (DCOM) components to provide a user interface on a display of client 802. The web server 810 is typically a program such as MICROSOFT'S INTERNET INFORMATION SERVER.

Web server 810 may host an Active Server Page (ASP) or Internet Server Application Programming Interface (ISAPI) application 812, which may be executing scripts. The scripts invoke objects that execute business logic (referred to as business objects). The business objects then manipulate data in database 816 through a database management system (DBMS) 814. Alternatively, database 816 may be part of, or connected directly to, client 802 instead of communicating/obtaining the information from database 816 across network 804. When a developer encapsulates the business functionality into objects, the system may be referred to as a component object model (COM) system. Accordingly, the scripts executing on web server 810 (and/or application 812) invoke COM objects that implement the business logic. Further, server 806 may utilize MICROSOFT'S TRANSACTION SERVER (MTS) to access required data stored in database 816 via an interface such as ADO (Active Data Objects), OLE DB (Object Linking and Embedding Data-Base), or ODBC (Open DataBase Connectivity).

Generally, these components 800-816 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 802 and 806 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 802 and 806. Embodiments of the invention are implemented as a software/CAD application on a client 802 or server computer 806. Further, as described above, the client 802 or server computer 806 may comprise a thin client device or a portable device that has a multi-touch-based display.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention provide for the use of Autoregressive Transformers (also referred to as Autoregressive Transformer models) and a progressive preview display to provide intelligent annotation suggestions that become more accurate with each user input. Most solutions today either employ algorithms that display too many dimensions or display all of the dimensions at the same time which makes it difficult for the user to adjust any wrong suggestions or improve the suggestions' accuracy with more user inputs. Thus, embodiments of the invention provide the ability to generate annotations from any two points/hosts in a drawing. In addition, embodiments of the invention provide a range of annotations such as dimensions, leaders, etc. and are not limited to just dimensions.

In view of the above, embodiments of the invention speed up and simplify the annotation process which can be very time-consuming and tedious for users. Further embodiments of the invention provide the ability for users to better focus on their designs which in turn, leads to less errors and higher productivity.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for annotating a computer-aided design (CAD) drawing, comprising:
    (a) obtaining one or more existing drawings, wherein each of the one or more existing drawings comprise:
        (1) one or more geometries that serve as annotation points; and
        (2) annotations associated with the annotation points;
    (b) extracting the one or more geometries;
    (c) training an Autoregressive Transformer model on the extracted one or more geometries and the annotations of the one or more existing drawings;
    (d) obtaining a new drawing, wherein the new drawing comprises one or more new geometries;
    (e) receiving first user input selecting a first geometry of the one or more new geometries and creating a first annotation;
    (f) extracting the one or more new geometries from the new drawing;
    (g) the Autoregressive Transformer model generating one or more potential new annotation points and one or more potential new annotations associated with the one or more potential new annotation points, wherein:
        (1) the one or more potential new annotation points and one or more potential new annotations are based on: the extracted one or more new geometries; the first geometry; and the first annotation;
        (2) the one or more potential new annotation points are connected to the first geometry selected via the first user input; and
        (3) the one or more potential new annotation points fall within a defined spatial boundary;
    (h) displaying the one or more potential new annotations in the new drawing; and
    (i) receiving second user input selecting one or more of the one or more potential new annotations to utilize as one or more new annotations.

2. The computer-implemented method of claim 1, wherein a number of the one or more potential new annotation points fall within a specified limit.

3. The computer-implemented method of claim 1, wherein each of the one or more geometries comprises a vertex or a line.

4. The computer-implemented method of claim 1, wherein:
    the Autoregressive Transformer model generates an attribute for the one or more potential new annotations;
    the attribute comprises a type of annotation.

5. The computer-implemented method of claim 4, wherein the type comprises a dimension.

6. The computer-implemented method of claim 4, wherein the type comprises a leader.

7. The computer-implemented method of claim 1, wherein:
    the Autoregressive Transformer model generates an attribute for the one or more potential new annotations;
    the attribute comprises an offset for each of the one or more potential new annotations from a corresponding annotation point to a dimension line.

8. The computer-implemented method of claim 1, wherein:
    the Autoregressive Transformer model generates an attribute for the one or more potential new annotations;
    the attribute comprises a style for each of the one or more potential new annotations.

9. The computer-implemented method of claim 1, wherein the receiving second user input comprises:
    cycling through each of the one or more potential new annotations via use of a keyboard control mechanism.

10. The computer-implemented method of claim 1, wherein the receiving second user input comprises:
    selecting the one or more of the one or more potential new annotations via a cursor control device.

11. A computer-implemented system for annotating a computer-aided design (CAD) drawing, comprising:
    (a) a computer having a memory;
    (b) a processor executing on the computer;
    (c) the memory storing a set of instructions, wherein the set of instructions, when executed by the processor cause the processor to perform operations comprising:
        (1) obtaining one or more existing drawings, wherein each of the one or more existing drawings comprise:
            (i) one or more geometries that serve as annotation hosts; and
            (ii) annotations associated with the annotation points;
        (2) extracting the one or more geometries;
        (3) training an Autoregressive Transformer model on the extracted one or more geometries and the annotations of the one or more existing drawings;

(4) obtaining a new drawing, wherein the new drawing comprises one or more new geometries;

(5) receiving first user input selecting a first geometry of the one or more new geometries and creating a first dimension;

(6) extracting the one or more new geometries from the new drawing;

(7) the Autoregressive Transformer model generating one or more potential new annotation points and one or more potential new annotations associated with the one or more potential new annotation points, wherein:

(i) the one or more potential new annotation points and one or more potential new annotations are based on: the extracted one or more new geometries; the first geometry; and the first annotation;

(i) the one or more potential new annotation points are connected to the first geometry selected via the first user input; and (ii) the one or more potential new annotation points fall within a defined spatial boundary;

(8) displaying the one or more potential new annotations in the new drawing; and (9) receiving second user input selecting one or more of the one or more potential new annotations to utilize as one or more new annotations.

12. The computer-implemented system of claim 11, wherein a number of the one or more potential new annotation points fall within a specified limit.

13. The computer-implemented system of claim 11, wherein each of the one or more geometries comprises a vertex or a line.

14. The computer-implemented system of claim 11, wherein the operations further comprise:
   the Autoregressive Transformer model generating an attribute for the one or more potential new annotations;
   wherein the attribute comprises a type of annotation.

15. The computer-implemented system of claim 14, wherein the type comprises a dimension.

16. The computer-implemented system of claim 14, wherein the type comprises a leader.

17. The computer-implemented system of claim 11, wherein the operations further comprise:
   the Autoregressive Transformer model generating an attribute for the one or more potential new annotations;
   the attribute comprises an offset for each of the one or more potential new annotations from a corresponding point to the dimension line.

18. The computer-implemented system of claim 11, wherein the operations further comprise:
   the Autoregressive Transformer model generating an attribute for the one or more potential new annotations;
   the attribute comprises a style for each of the one or more potential new annotations.

19. The computer-implemented system of claim 11, wherein the operation receiving second user input comprises:
   cycling through each of the one or more potential new annotations via use of a keyboard control mechanism.

20. The computer-implemented system of claim 11, wherein the operation receiving second user input comprises:
   selecting the one or more of the one or more potential new annotations via a cursor control device.

\* \* \* \* \*